United States Patent
Teeter (10) Patent No.: US 9,690,343 B2
(45) Date of Patent: Jun. 27, 2017

(54) POWER DISTRIBUTION SYSTEM

(71) Applicant: Dell Products L.P., Round Rock, TX (US)

(72) Inventor: Victor B. Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 14/178,102

(22) Filed: Feb. 11, 2014

(65) Prior Publication Data

US 2015/0227182 A1 Aug. 13, 2015

(51) Int. Cl.
*G06F 1/26* (2006.01)

(52) U.S. Cl.
CPC .............. *G06F 1/263* (2013.01); *G06F 1/266* (2013.01)

(58) Field of Classification Search
CPC . G06F 1/26; G06F 1/266; H04L 12/10; B60R 16/03
See application file for complete search history.

(56) References Cited

U.S. PATENT DOCUMENTS

| | | | | |
|---|---|---|---|---|
| 7,966,502 B2* | 6/2011 | Diab | ........................ | G06F 1/26 713/300 |
| 8,247,927 B2* | 8/2012 | Togawa | .................. | H04B 3/44 307/112 |
| 8,261,001 B2* | 9/2012 | Bobrek | .................. | G06F 1/266 710/310 |
| 2005/0201306 A1* | 9/2005 | Engel | ...................... | H04L 12/10 370/299 |
| 2006/0273661 A1* | 12/2006 | Toebes | ..................... | G06F 1/266 307/106 |
| 2007/0081553 A1* | 4/2007 | Cicchetti | ................. | H04L 12/10 370/466 |
| 2009/0031152 A1* | 1/2009 | Bolderl-Ermel | ........ | G06F 1/266 713/300 |
| 2009/0063874 A1* | 3/2009 | Diab | ....................... | G06F 1/266 713/300 |
| 2009/0073957 A1* | 3/2009 | Newland | ................. | H04L 12/10 370/352 |
| 2009/0164805 A1* | 6/2009 | Diab | ......................... | G06F 1/26 713/300 |
| 2013/0049469 A1* | 2/2013 | Huff | ......................... | G06F 1/266 307/62 |

* cited by examiner

*Primary Examiner* — Thomas Lee
*Assistant Examiner* — Gary Collins
(74) *Attorney, Agent, or Firm* — Haynes and Boone, LLP (57) ABSTRACT

A power distribution system includes a chassis with a plurality of ports that include a first port configured to communicate with powering devices and a second port configured to communicate with powered devices. A power distribution engine in the chassis is coupled to each of the plurality of ports. The power distribution engine determines that power available to the power distribution engine is insufficient to power a first powered device that is coupled to the first port, requests power from a first powering device that is coupled to the second port, and provides power that is received through the second port from the first powering device to the first powered device through the first port. In an embodiment, the first powered device and the second powered device are switch IHSs, the first port is configured as a trunk port, and the second port is configured as an access port.

17 Claims, 6 Drawing Sheets

POWER DISTRIBUTION SYSTEM

BACKGROUND

The present disclosure relates generally to information handling systems, and more particularly to a power distribution system for information handling systems As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, Power over Ethernet (PoE) enabled IHSs are configured to provide power to other IHSs over the Ethernet cables that connect them. For example, PoE enabled switch IHSs may include a power system that couples to a power source such as a wall outlet, as well as to a PoE engine that is configured to provide power from the power source to powered IHSs connected to ports on the POE enabled switch IHS. However, such PoE enabled switch IHSs typically have a limited amount of power to distribute to their connected powered IHSs due to, for example, the need to use a majority of the power received by the power system from the power source to power the PoE enabled switch IHS and/or its components. When subject to a power usage spike, those PoE enabled switch IHSs may not have enough power for each of its connected powered IHSs.

Conventional solutions to this problem involved assigning a priority to each of the powered IHSs connected to a PoE enabled switch IHS, and providing power received by the power system from the power source to the powered IHSs based on their priorities. For example, a user of the PoE enabled switch IHS may assign a priority tag such as "critical", "high", and "low" to ports on the PoE enabled switch IHS that are connected to powered IHSs depending the importance of the operation of those powered IHSs to the user. When power is limited, or a powered IHS connected to a port on the PoE enabled switch that is assigned a higher priority needs more power, ports on the PoE enabled switch that are assigned a lower priority may be shut down, or have their supplied power reduced, in order to ensure that power is available to ports on the PoE enabled switch that are assigned a higher priority. However, such solutions lead to lower availability of powered IHSs, which can add cost associated with running the system, loss of data, and calls to technical support.

Accordingly, it would be desirable to provide an improved power distribution system.

SUMMARY

According to one embodiment, a power distribution system includes a chassis; a plurality of ports that are located on the chassis, wherein a first port of the plurality of ports is configured to communicate with powering devices, and wherein a second port of the plurality of ports is configured to communicate with powered devices; a power distribution engine that is included in the chassis and that is coupled to each of the plurality of ports, wherein the power distribution engine is configured to: determine that power available to the power distribution engine is insufficient to power a first powered device that is coupled to the first port; request power from a first powering device that is coupled to the second port; and provide power that is received through the second port from the first powering device to the first powered device through the first port.

BRIEF DESCRIPTION OF THE DRAWINGS

FIG. 2b is a schematic view illustrating an embodiment of the switch IHS of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
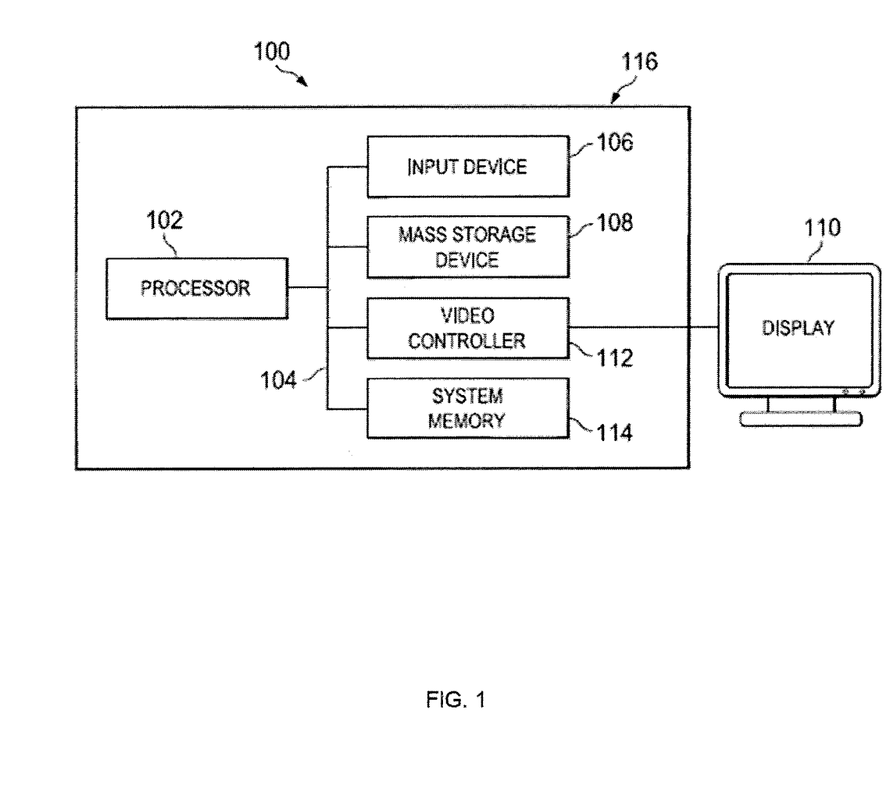
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
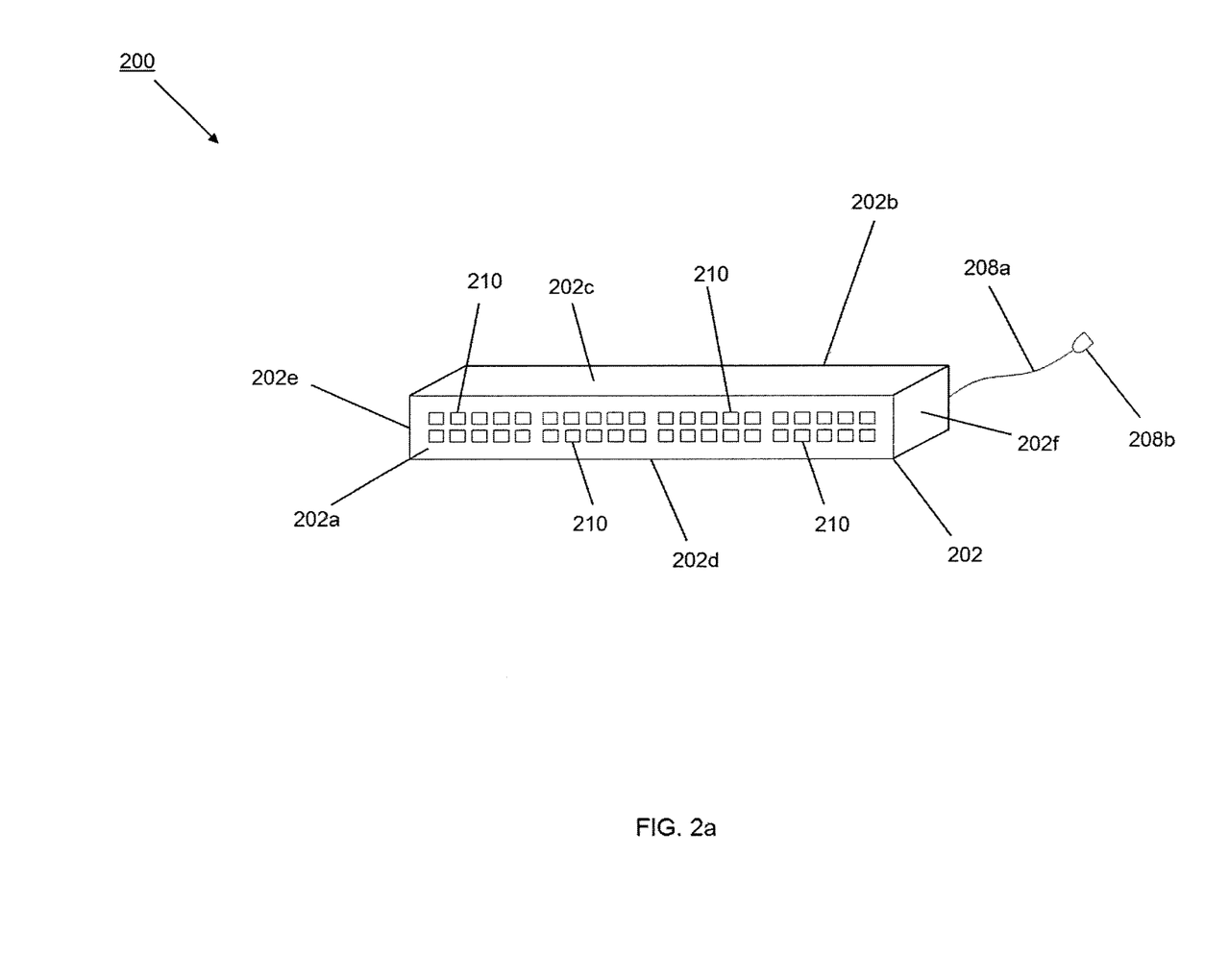
FIG. 2a is a front view illustrating an embodiment of a switch IHS.
Figure 2B:
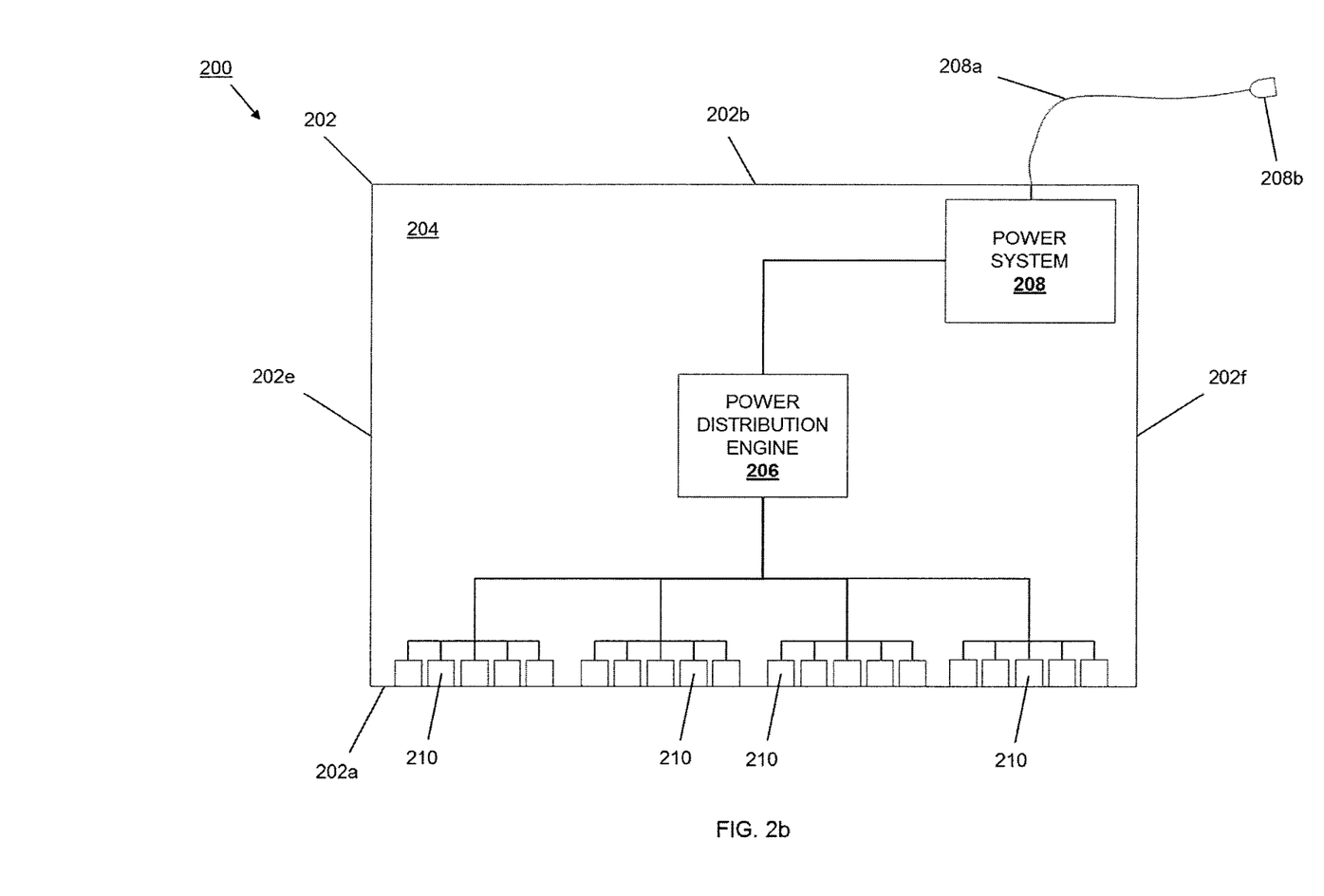

Referring now to FIGS. 2a and 2b, an embodiment of a powering device 200 is illustrated. In an embodiment, the powering device 200 may be the IHS 100, discussed above with reference to FIG. 1, and/or may include some or all of the components of the IHS 100. In the illustrated embodiment, the powering device 200 is a switch IHS. However, the powering device 200 may be a server IHS, a storage IHS, other types of networking IHSs, and/or a variety of other IHSs known in the art while remaining within the scope of the present disclosure. As discussed in further detail below, the powering device 200 is configured to provide power to one or more connected powered devices. For example, the powering device 200 may be a Power over Ethernet (PoE) enabled device, a PoE+ enabled device, a Universal PoE (UPoE) enabled device, and/or be enabled with a variety of other power provisioning technologies known in the art. As such, the powering device 200 may be configured to provide power over cables (e.g., Ethernet cables) to powered devices that are connected to those cables.

The powering device 200 includes a chassis 202 having a front surface 202a, a rear surface 202b that is located opposite the chassis 202 from the front surface 202a, a top surface 202c that extends between the front surface 202a and the rear surface 202b, a bottom surface 202d that is located opposite the chassis 202 from the top surface 202c and that extends between the front surface 202a and the rear surface 202b, and a pair of side surfaces 202e and 202f that are located opposite the chassis 202 from each other and that each extend between the front surface 202a, the rear surface 202b, the top surface 202c, and the bottom surface 202d. A chassis housing 204 is defined by the chassis 202 between the front surface 202a, the rear surface 202b, the top surface 202c, the bottom surface 202d, and the side surfaces 202e and 202f. In an embodiment, the powering device 200 may include a processing system (e.g., the processor 102 discussed above with reference to FIG. 1) that is located in the chassis housing 202 and that is coupled to a non-transitory memory system (e.g., the system memory 114 discussed above with reference to FIG. 1) that is located in the chassis housing 202 and that includes instruction that, when executed by the processing system, cause the processing system to provide a power distribution engine 206 that is configured to perform the functions of the power distributions engines discussed below.

In the illustrated embodiment, the power distribution engine 206 is coupled to a power system 208 (e.g., through the coupling of the processing system in the chassis housing 202 with the power system 208) that is located in the chassis housing 202 and that includes a power cable 208a that extends from the rear surface 202b of the chassis 202 and includes a power source connector 208b on its distal end. The power system 208 may be configured to receive power from a power source (e.g., through the power source connected 208b and power cable 208a), convert that power such that it may be used by components of the powering device 200, and/or provide a variety of other power system functions known in the art. However, in other embodiments, the power system 208 may be omitted and the power distribution engine 206 may operate to distribute power received through its ports from other powering devices, discussed in further detail below. The power distribution engine 206 is also coupled to a plurality of ports 210 that are located on the front surface 202a of the chassis 202. In an embodiment, any or all of the plurality of ports 210 may be configured to receive power from another powering device, provide power to another powering device, and/or provide power to a powered device. For example, any or all of the plurality of ports 210 may be PoE ports, PoE+ ports, UPoE ports, and/or a variety of other power receiving and/or provisioning ports known in the art. One of skill in the art in possession of the present disclosure will recognize that, in some embodiments, all of the plurality of ports 210 may provision/receive power, while in other embodiments, some of the plurality of ports 210 may not provision/receive power. It should be understood that the powering device 200 may include a variety of other components (e.g., networking components, computing components, etc.) that have been omitted for clarity of illustration and discussion.

In the embodiments illustrated and described below, the powering device(s) 200 are switch IHSs, and the plurality of ports 210 may be configured by a user, administrator, or automatically as access ports for connection to powered devices, or as trunk ports for connection to powering devices (e.g., other switch IHSs in the embodiments illustrated and described below.) Furthermore, any subset of plurality of the ports 210 may be aggregated/grouped by configuring that subset as a Link Aggregation Group (LAG) or other aggregation/group known in the art. The details for configuring the ports 210 on the powering device 200 as access ports, trunk ports, or in a LAG should be understood by those of skill in the art and is not discussed herein in detail. However, one of skill in the art will recognize that the plurality of ports 210 may not be part of a switch IHS (e.g., they may be part of another type of IHS or powering device), and/or may not configured as access ports, trunk ports, or part of a LAG while remaining within the scope of the present disclosure. Thus, while the discussion and illustrations below focus on a plurality of switch IHS powering devices that are coupled together through ports that are configured as trunk ports, while also being coupled to powered devices through ports that are configured as access ports, and that operate to share power between each other through the trunk ports for provision to their respective powered devices through the access ports, other types of IHSs/powering devices having other types of ports are envisioned as falling within the scope of the present disclosure.

Figure 3:
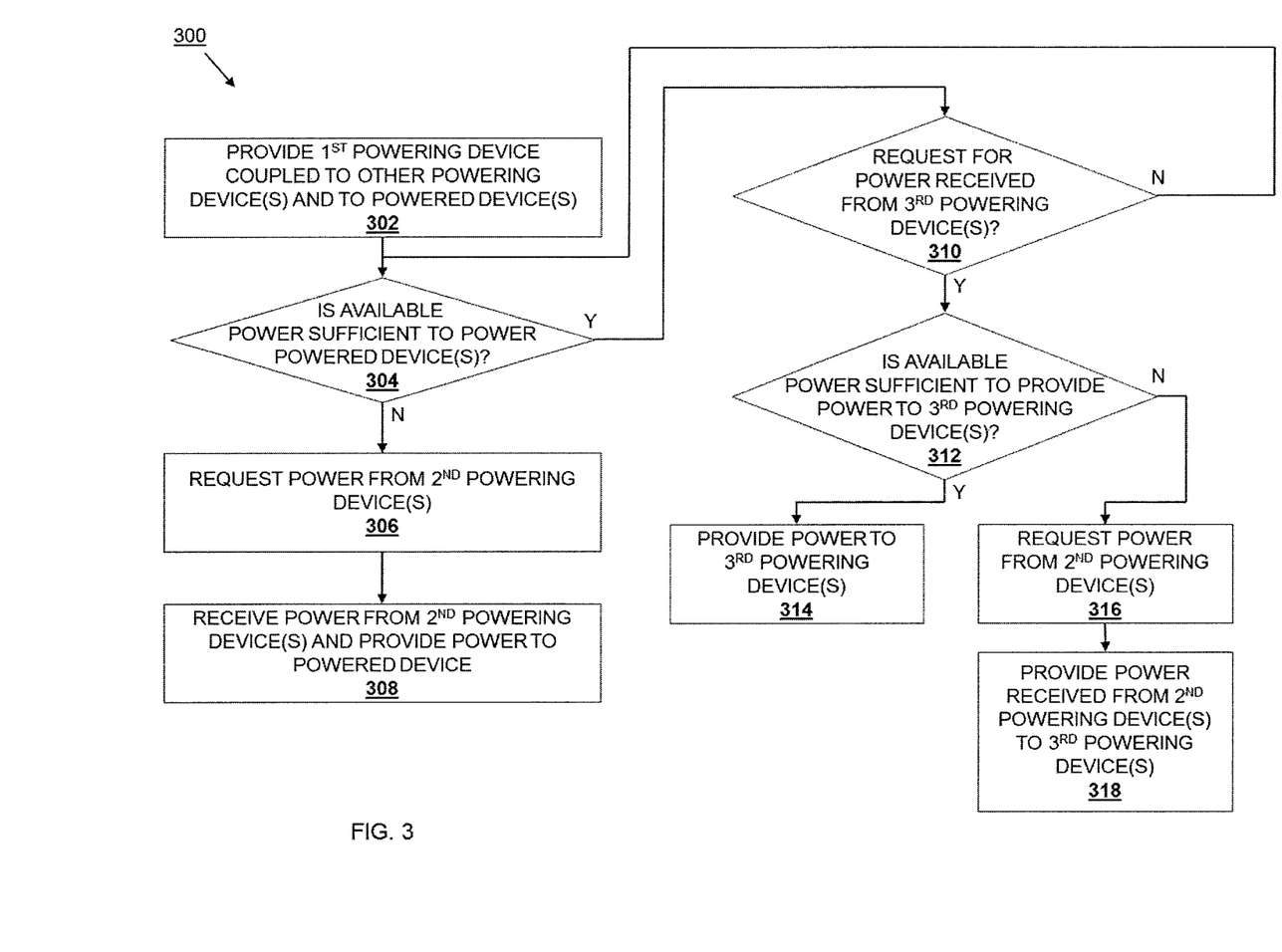
FIG. 3 is a flow chart illustrating an embodiment of a method for distributing power.
Figure 4:
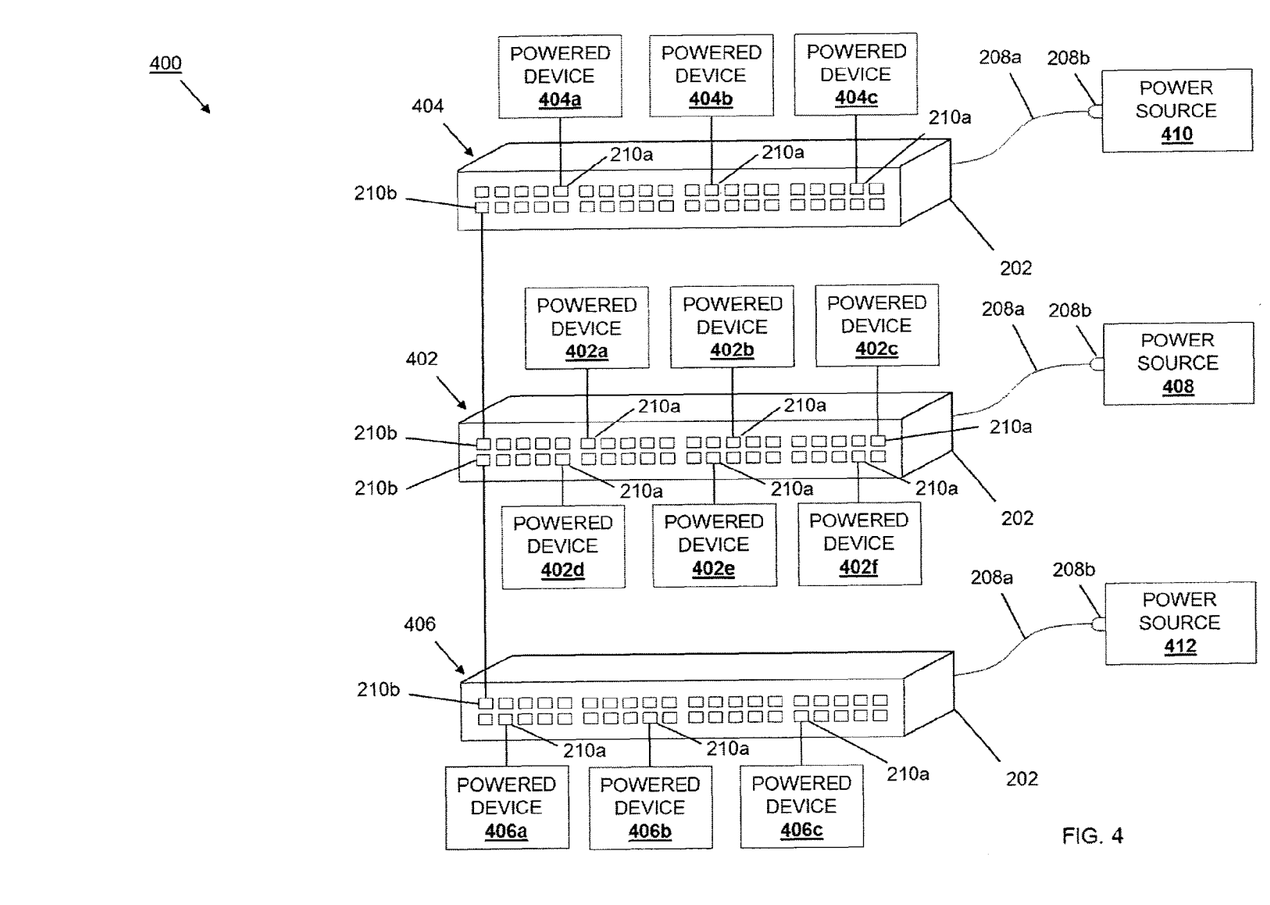
FIG. 4 is a schematic view illustrating an embodiment of a plurality of the switch IHSs of FIGS. 2a and 2b coupled to each other, powered devices, and power sources.

Referring now to FIGS. 3 and 4, an embodiment of a method 300 for distributing power is illustrated. The method 300 begins at block 302 where a first powering device is provided that is coupled to other power device(s) and to powered device(s). Referring to FIG. 4, an embodiment of an IHS 400 is illustrated that is provided during block 302 of the method 300. The IHS 400 includes a first powering device 402, a second powering device 404, and a third powering device 406. In the illustrated embodiment, each of the first powering device 402, the second powering device 404, and the third powering device 406 are substantially similar to the powering device 200 discussed above with reference to FIGS. 2a and 2b, and include the same reference numbers for similar components.

The power source connector 208*b* on the power cable 208*a* that extends from the first powering device 402 is coupled to a power source 408. A subset of the plurality of ports 210 on the first powering device 402 have been configured as access ports 210*a*, and are each coupled (e.g., via a cable such as an Ethernet cable) to a respective powered device 402*a*, 402*b*, 402*c*, 402*d*, 402*e*, and 402*f*. A subset of the plurality of ports 210 on the first powering device 402 have been configured as trunk ports 210*b*. Similarly, the power source connector 208*b* on the power cable 208*a* that extends from the second powering device 404 is coupled to a power source 410. A subset of the plurality of ports 210 on the second powering device 404 have been configured as access ports 210*a*, and are each coupled (e.g., via a cable such as an Ethernet cable) to a respective powered device 404*a*, 404*b*, and 404*c*. A subset of the plurality of ports 210 on the second powering device 404 have been configured as trunk ports 210*b*. Also similarly, the power source connector 208*b* on the power cable 208*a* that extends from the third powering device 406 is coupled to a power source 412. A subset of the plurality of ports 210 on the third powering device 406 have been configured as access ports 210*a*, and are each coupled (e.g., via a cable such as an Ethernet cable) to a respective powered device 406*a*, 406*b*, and 406*c*. A subset of the plurality of ports 210 on the third powering device 406 have been configured as trunk ports 210*b*.

In an embodiment, any of the powered devices 402*a-f*, 404*a-c*, and 406*a-c* may be wireless access points, cameras, phones, clocks, security access devices, remote sensors, remote monitoring devices, powered Bluetooth devices, radio frequency identification (RFID) readers, personal digital assistants (PDAs), laptop computers, and/or a variety of other powered devices known in the art. The power sources 408, 410, and 412 may be the same power source, different power sources, and combinations thereof, and may include, for example, power sources that may be connected to through a wall outlet (as illustrated), hardwired power sources, and/or a variety of other power sources known in the art. The first powering device 402 is coupled (e.g., via a cable such as an Ethernet cable) through one of its trunk ports 210*b* to a trunk port 210*b* on the second powering device 404. That first powering device 402 is also coupled (e.g., via a cable such as an Ethernet cable) through one of its trunk ports 210*b* to a trunk port 210*b* on the third powering device 406. While the illustrated example provides only three switch IHS powering devices coupled together through trunk ports, while being coupled to powered devices through access ports, and being coupled to power sources, more or fewer powering devices, other types of powering devices, more or fewer powered devices, more or fewer power sources, other types of couplings and coupling ports, and/or a wide variety of other modifications to the IHS 400 will provide systems that will benefit from the power distribution techniques discussed below and are envisioned as falling within the scope of the present disclosure.

The method 300 then proceeds to decision block 304 where the first powering device determines whether its available power is sufficient to power its powered device(s). While the examples provided below discuss power distribution in the IHS 400 from the "point of view" of the first powering device 402, any of the powering devices 402, 404, and/or 406 may operate according to the method 300 to distribute power substantially as discussed below for the first powering device 402. In an embodiment of block 304, the power distribution engine 206 in the first powering device 402 compares the power available through its power system 208 (e.g., via the connection of that power system 208 to the power source 408) to the current power consumption, power requirements, power requests, and/or other power needs of its connected powered devices 402*a-f*, and determines whether the power available from its power system 208 is sufficient to power each of its powered devices 402*a-f*.

In some embodiments, the power distribution engine 206 in the first powering device 402 may determine a power insufficiency amount that is the difference in the amount of power available from its power system 208 and the amount of power consumed, required, requested, or otherwise needed by its powered devices 402*a-f*. In other embodiments, the power distribution engine 206 in the first powering device 402 may simply determine that there is a power insufficiency (e.g., that one or more of the powered devices 402*a-f* is not receiving enough power, not operating optimally, and/or is otherwise power deficient) without quantifying that power insufficiency. In some embodiment, the determination that there is insufficient power at decision block 304 may include a real time determination of the current power situation (e.g., currently available power vs. current power consumption). In other embodiments, the determination that there is insufficient power at decision block 304 may include a prediction of a future power situation (e.g., expected power availability at a future time vs. predicted power consumption at that future time). While a few examples are provided, any methods for determining a power insufficiency from an available power are envisioned as falling within the scope of the present disclosure.

If, at decision block 304, the power distribution engine 206 in the first powering device 402 determines that the power available from the power system 208 is not sufficient to power one or more its powered devices 402*a-f*, the method 300 then proceeds to block 306 where the first powering device 402 requests power from second powering device(s). In an embodiment, the power distribution engine 206 in the first powering device 402 communicates, via its coupling with the second powering device 404 through their respective trunk ports 210*b*, a request for power from the second powering device 404. In some embodiments, the request for power at block 306 may be a request for the power insufficiency amount discussed above (e.g., an estimation of an amount of power needed to sufficiently power the powered devices 402*a-f*). In other embodiments, the request for power at block 306 may be a request for any surplus power available to the second powering device 404.

Furthermore, while the first powering device 402 is illustrated and described as requesting power from a single second powering device 404, the first powering device 402 may request power from any number of powering devices (e.g., the first powering device 402 may also request power from the third powering device 406) at block 306. In some embodiments, the first powering device 402 may request power from more than one other powering device in response to determining that the second powering device 404 from which power was requested at block 306 does not have enough power to provide to the first powering device 402 to sufficiently power its powered device(s). As such, power may be requested by the first powering device from other powering devices based on a priority of those other powering device, based on which of those other powering devices has the highest surplus of power, based on which of those powering device has the fewest powered devices connected to it, etc. In another embodiment, the first powering device 402 may request power from more than one other powering device at block 306 in requested power amounts that distribute the power needed by the first powering device 402 to power its powered device(s) amongst each of the other powering device from which it is requesting power. While a few examples are provided, any methods for requesting power are envisioned as falling within the scope of the present disclosure.

Upon the power distribution engine 206 in the second powering device 404 determining that there is sufficient power available to provide to the first powering device 402, discussed in further detail below with regard to the first powering device 402 and with reference to decision block 312, the method 300 proceeds to block 308 where the first powering device receives power from the second powering device and provides power to its powered device(s). In an embodiment, the power distribution engine 206 in the second powering device 404 is configured to provide power from its power system 208 to the first powering device 402 via its coupling with the first powering device 402 through their respective trunk ports 210*b*. At block 308, the power distribution engine 206 in the first powering device 402 receives that power from the second powering device 404 and provides that power to the powered devices for which it was determined there was insufficient power available at decision block 304. The first powering device 402 may then operate to receive power from the second powering device 404 and provide that power to one or more of its powered devices 402*a-f* until the power distribution engine 206 determines that the power available through the power system 208 in the first powering device 402 is sufficient to power each of its powered devices 402*a-f*. For example, upon determining that the power available through the power system 208 is sufficient to power each of the powered devices 402*a-f*, the power distribution engine 206 in the first powering device 402 may send a signal to the power distribution engine 206 in the second powering device 404 to cease providing power via its coupling with the first powering device 402 through their respective trunk ports 210*b*. As discussed above, the first powering device 402 may receive power from more than one other powering device at block 308, and may operate to receive, provision, and cease receiving that power from those other powering devices in substantially the same manner as described above with the second powering device 404. Furthermore, even in the event that other powering device are not able to provide enough power to the first powering device 402 to sufficiently power all of its powered devices 402*a-f*, any surplus power available to the other powered devices may be received and provisioned to its powered devices 402*a-f* by the first powering device 402 in order to sufficiently power as many of its powered device 402*a-f* as possible (e.g., using a priority scheme that prioritizes the powered devices 402*a-f* relative to each other).

Thus, the first powering device 402 may determine its available power (e.g., through its power system 208) is insufficient to power one or more of its powered devices 402*a-f* (e.g., due to a spike in power use by the powering device 402 and/or any of the powered devices 402*a-f*), and may then request and receive power from one or more connected powering devices and use that power to ensure that each of its powered devices 402*a-f* receives sufficient power. While only the first powering device 402 is illustrated as requesting and receiving power from the second powering device 404 at blocks 306 and 308, the first powering device 402 may request and receive power from the third powering device 406 in substantially the same manner as discussed above for the second powering device 404. As discussed above, each of the second powering device 404 and the third powering device 406 may also request and receive power from the first powering device 402 (or other connected powering devices, not illustrated) substantially similarly as described above for the first powering device 402. As such, power may be allocated throughout the IHS 400 from powering devices that have a surplus of power to powering devices that are running (or about to run) at a power deficit.

If, at decision block 304, it is determined that there is sufficient power available to the first powering device to power each of its powered devices, the method 300 may proceed to decision block 310 where it is determined whether the first powering device has received a request for power from a third powering device. In an embodiment of decision block 310, the power distribution engine 206 in the first powering device 402 may determine whether a request for power has been received from the third powering device 406 via its coupling with the third powering device 406 through their respective trunk ports 210*b*. As discussed above, the third powering device 406 may send requests for power other powering devices as well, and those other powering devices may operate substantially as discussed below for the first powering device 402. If at decision block 310 the power distribution engine 206 in the first powering device 402 determines that no request for power has been received from a third powering device, the method 300 proceeds back to decision block 304.

If at decision block 310 the power distribution engine 206 in the first powering device 402 determines that a request for power has been received from the third powering device 406, the method 300 proceeds to decision block 312 where it is determined whether power available to the first powering device is sufficient to provide power to the third powering device. In an embodiment of decision block 312, the power distribution engine 206 in the first powering device 402 may determine a surplus power amount that is available through its power system 208 and that is not being used by the first powering device 402 or its powered devices 402*a-f*. In other embodiments, the power distribution engine 206 in the first powering device 402 may simply determine that there is a power surplus (e.g., that each of the powered devices 402*a-f* is receiving full power, that there is unused power available from the power system 208, etc.) without quantifying that power surplus. In an embodiment, the request received at decision block 310 from the third powering device 406 may include a power insufficiency amount that may be an amount of power needed by the third powering device 406 to sufficiently power each of its powered devices 406*a-c*, and the power distribution engine 206 in the first powering device 402 may determine whether its power surplus is sufficient to provide power to the third powering device 406 via its coupling with the third powering device 402 through their respective trunk ports 210*b*. For example, the power distribution engine 206 in the first powering device 402 may determine whether its power surplus is greater than or equal to a power insufficiency amount that was requested by the third powering device 406. In another example, the power distribution engine 206 in the first powering device 402 may simply determine that it has a power surplus, all of which is available to provide to the third powering device 406, regardless of whether or not that power surplus is greater than or equal to a power insufficiency amount that was requested by the third powering device 406.

If, at decision block 312, the power distribution engine 206 in the first powering device 402 determines that there is sufficient power available to provide power to the third powering device 406, the method 300 proceeds to block 314 where power is provided to the third powering device. In an embodiment, the power distribution engine 206 in the first powering device 402 may provide any or all of its power surplus to the third powering device 406. For example, the first powering device 402 may provide an amount of its power surplus that is equal to a power insufficiency amount requested by the third powering device 406. In another it example, the first powering device 402 may provide all of its power surplus to the third powering device 406. The first powering device 402 may then operate to provide power to the third powering device 406 for distribution to one or more of its powered devices 406a-c until the power distribution engine 206 in the third powering device 406 determines that the power available through its power system 208 is sufficient to power each of its powered devices 406a-c. For example, upon determining that the power available through its power system 208 is sufficient to power each of its powered devices 406a-c, the power distribution engine 206 in the third powering device 406 may send a signal to the power distribution engine 206 in the first powering device 402 to cease providing power via its coupling with the third powering device 406 through their respective trunk ports 210b.

In embodiments where the power surplus available to the first powering device 402 for provision to the third powering device 406 is insufficient to sufficiently power the powered devices 406a-c connected to the third powering device 406, other powering devices connected to the third powering device 406 may operate to provide power substantially as discussed above for the first powering device 402 in order to allow the powered devices 406a-c connected to the third powering device 406 to be sufficiently powered. Furthermore, even in the event that other powering device are not able to provide enough power to the third powering device 406 to sufficiently power all of its powered devices 406a-c, any surplus power available to the other powered devices may be received and provisioned to its powered devices 406a-c by the third powering device 406 in order to sufficiently power as many of its powered device 406a-c as possible (e.g., using a priority scheme that prioritizes the powered devices 406a-c relative to each other).

If, at decision block 312, the power distribution engine 206 in the first powering device 402 determines that there is not sufficient power available to provide power to the third powering device 406, the method 300 proceeds to block 316 where the first powering device 402 requests power from a second powering device(s). For example, at decision block 312, the power distribution engine 206 in the first powering device 402 may determine that there is no power surplus available to provide to the third powering device 406. In another example, at decision block 312, the power distribution engine 206 in the first powering device 402 may determine that the power surplus available to provide to the third powering device 406 is insufficient to sufficiently power the powered devices 406a-c connected to the third powering device 406 (e.g., based on a power insufficiency amount received from the third powering device 406. In an embodiment, the power distribution engine 206 in the first powering device 402 communicates, via its coupling with the second powering device 404 through respective trunk ports 210b, a request for power from the second powering device 404. In some embodiments, the request for power at block 316 may be a request for the power insufficiency amount received from the third powering device 406. In other embodiments, the request for power at block 316 may be a request for a power amount that is the difference between the power surplus available to the first powering device 402 and a power insufficiency amount requested by the third powering device 406. In yet other embodiments, the request for power at block 316 may be a request for any surplus power available to the second powering device 404. While a few examples are provided, any methods for requesting power are envisioned as falling within the scope of the present disclosure.

The method 300 then proceeds to block 318 where power received from the second powering device is provided to the third powering device. In an embodiment, the power distribution engine 206 in the first powering device 402 may receive power from the second powering device 404 via its coupling with the second powering device 404 through their respective trunk ports 210b substantially as described above with reference to block 308, and provide that power to the third powering device 406 via its coupling with the third powering device 406 through their respective trunk ports 210b. In one example, the first powering device 402 may receive power from the second powering device 404 and provide that power to the third powering device 406 without providing any power surplus from its power system 208. In another example, the first powering device 402 may receive power from the second powering device 404 and provide that power to the third powering device 406 along with at least a portion of a power surplus from its power system 208 substantially as described above in block 314. The first powering device 402 may then operate to receive power from the second powering device 404 and provide that power (along with providing power from its own power system 208 in some embodiments) to the third powering device 406 for distribution to one or more of its powered devices 406a-c until the power distribution engine 206 in the third powering device 406 determines that the power available through its power system 208 is sufficient to power each of the powered devices 406a-c. For example, upon determining that the power available through its power system 208 is sufficient to power each of the powered devices 406a-c, the power distribution engine 206 in the third powering device 406 may send a signal to the power distribution engine 206 in the first powering device 402 to cease providing power via its coupling with the third powering device 406 through third respective trunk ports 210b, and the power distribution engine 206 in the first powering device 402 may then send a signal to the power distribution engine 206 in the second powering device 404 to cease providing power via its coupling with the first powering device 406 through their respective trunk ports 210b.

Thus, the first powering device 402 may provide surplus power that is available through its power system 208 to a third connected powering device for use in ensuring that each of the powered devices coupled to that third connected powering device receive sufficient power. Furthermore, the first powering device 402 may provide surplus power that is available from a second connected powering device to a third connected powering device for use in ensuring that each of the powered devices coupled to that third connected powering device receive sufficient power. While only the first powering device 402 is discussed as providing (directly or as an intermediary) power to the third powering device 406, the first powering device 402 may retrieve power from and/or provide power to any number of connected powering devices. As discussed above, each of the second powering device 404 and the third powering device 406 may also provide power (directly or as an intermediary) to the first powering device 402 (or other connected powering devices, not illustrated) substantially similarly as described above for the first powering device 402. As such, power may be allocated throughout the IHS 400 from powering devices that have a surplus of power to powering devices that are running (or about to run) at a deficit.

Figure 5:
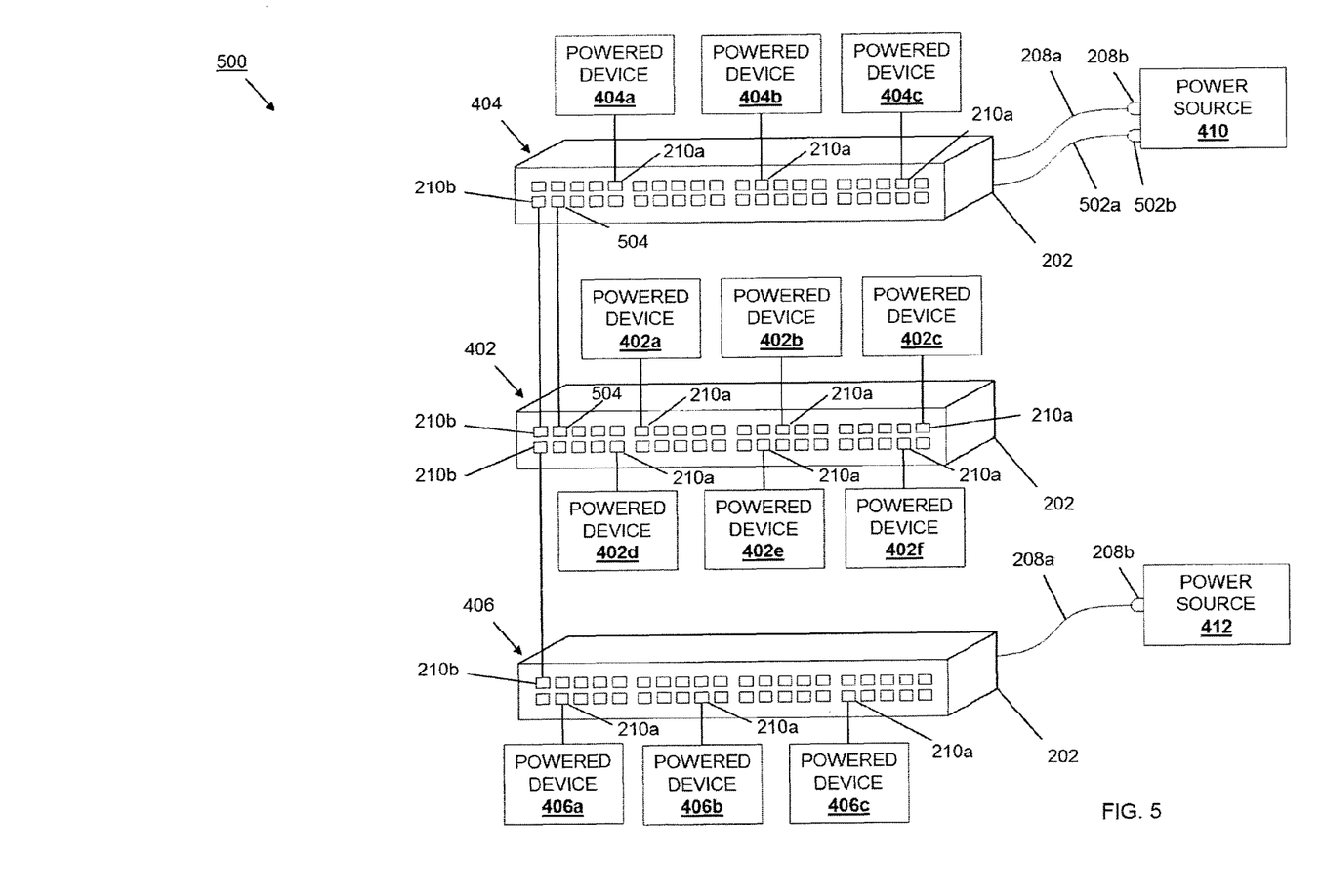
FIG. 5 is a schematic view illustrating another embodiment of a plurality of the switch IHSs of FIGS. 2a and 2b coupled to each other, powered devices, and power sources.

Referring now to FIG. 5, an embodiment of an IHS 500 is illustrated that is substantially similar to the IHS 400 discussed above, but with a few modifications. In the illustrated embodiment, the second powering device 404 in the IHS 500 includes multiple couplings to the power source 410, through the power cable 208*a* and power source connector 208*b* discussed above, as well as through a secondary power cable 502*a* and power source connector 502*b*. In an embodiment, the multiple couplings to the power source 410 are provided through multiple power systems (e.g., similar to the power system 208 discussed above), a larger power system, and/or a variety of enhanced power systems known in the art. Furthermore, in addition to being coupled together through their respective trunk ports 210*b* discussed above, the first powering device 402 and the second powering device 404 are coupled together with at least one additional set of respective secondary trunk ports 504. Further still, the first powering device 402 is not connected to a power source (i.e., the power source 408 has been omitted from the IHS 500, and in some embodiments the first powering device 402 may further have its power system 208 omitted as well.)

The IHS 500 illustrates how a powering device such as the first powering device 402 may receive all of its power from other powering devices (e.g., the second powering device 404 and the third powering device 406 in the illustrated embodiment.) As such, the first powering device 402 may operate according to the method 300 discussed above to ensure that each of its powered devices 402*a-f* are sufficiently powered through power requested and received from the second powering device 404 and/or the third powering device 406. Furthermore, the IHS 500 illustrates how a powering device such as the second powering device 404 may be configured to couple to a relatively large surplus of power (e.g., via the multiple couplings to the power source 410 and, in some embodiments, through the use of multiple power systems in the powering device 404) for provision to other powering devices. As such, the second powering device 404 may operate to supply power to a larger number of other powering devices and powered devices. Further still, the IHS 500 illustrates how powering devices such as the first powering device 402 and the second powering device 404 may be coupled together (e.g., via the multiple respective trunk ports 210*b* and 504) to increase the amount of power available that can be transmitted between powering devices. In an example, the trunk ports 210*b* and 504 on the first powering device 402 and/or the second powering device 404 may be aggregated and/or grouped such as, for example, by configuring those trunk ports 210*b* and 504 as a Link Aggregation Group (LAG). As such, the coupling provided between the first powering device 402 and the second powering device 404 through the trunk ports 210*b* and 504 may be configured to provide a higher data bandwidth and power bandwidth according to the method 300. While only two sets of trunk ports have been illustrated as being configured as part of a LAG, any number of trunk ports may be configured in a LAG while remaining within the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power distribution system, comprising:
a chassis;
a plurality of ports that are located on the chassis, wherein a first port of the plurality of ports is configured to both communicate data with powered devices and provide power to powered devices, and wherein each of a second port and a third port of the plurality of ports is configured to communicate data with powering devices, provide power to powering devices, and receive power from powering devices;
a power distribution engine that is included in the chassis and that is coupled to each of the plurality of ports, wherein the power distribution engine is configured to:
determine that power available to the power distribution engine is insufficient to power a first powered device that is coupled to the first port;
send, to a first powering device that is coupled to the second port and in response to determining that the power available to the power distribution engine is insufficient to power the first powered device, a request for power that is to be provided from the first powering device, wherein the first powering device is not providing power to the second port prior to sending the request;
receive power through the second port from the first powering device subsequent to sending the request;
provide power that is received through the second port from the first powering device to the first powered device through the first port;
communicate data to the first powered device through the first port;
receive, from a second powering device that is coupled to the third port, a request for power;
provide, in response to receiving the request for power from the second powering device, power that is received through the second port from the first powering device to the second powering device through the third port;
determine power provided to the second powering device through the third port is insufficient to satisfy the request for power from the second powering device and, in response, send, to the first powering device, a request for additional power;
receive additional power through the second port from the first powering device subsequent to sending the request for additional power; and
provide at least some of the additional power that is received through the second port from the first powering device to the second powering device through the third port.

2. The power distribution system of claim 1, wherein the first port is designated an access port, and wherein each of the second port and the third port are designated as trunk ports.

3. The power distribution system of claim 1, further comprising:
a power system that is included in the chassis and that is coupled to the power distribution engine, wherein the power system is configured to couple to a power source that is separate from the powering devices and provide power to the power distribution engine, and wherein the power distribution engine is configured to determine that power available from the power system is insufficient to power the first powered device that is coupled to the first port.

4. The power distribution system of claim 3, wherein the power distribution engine is further configured to:
provide power that is received from the power system to the second powering device through the third port.

5. The power distribution system of claim 1, further comprising:
a fourth port of the plurality of ports that is configured to communicate data with powering device, provide power to powering devices, and receive power from powering devices, wherein the power distribution engine is further configured to:
send, to the first powering device that is coupled to both the second port and the fourth port, the request for power that is to be provided from the first powering device, wherein the first powering device is not providing power to the second port and the fourth port prior to sending the request;
receive power through the second port and the fourth port from the first powering device subsequent to sending the request; and
provide power that is received through both the second port and the fourth from the first powering device to the first powered device through the first port.

6. An information handling system (IHS), comprising:
a first networking switch device;
a second networking switch device;
a third networking switch device that includes:
a first port that is coupled to the first networking switch device and that is configured to communicate data with the first networking switch device, provide power to the first networking switch device, and receive power from the first networking switch device;
a second port that is coupled to the second networking switch device and that is configured to communicate data with the second networking switch device, provide power to the second networking switch device, and receive power from the second networking switch device, and
a third port that is coupled to a first powered device and that is configured to communicate data with the first powered device and provide power to the first powered device, wherein the third networking switch device is configured to:
determine that power available to the third networking switch device is insufficient to power the first powered device;
send, through the first port to the first networking switch device and in response to determining that the power available to the third networking switch device is insufficient to power the first powered device, a request for power that is to be provided from the first networking switch device, wherein the first networking switch device is not providing power to the third networking switch device prior to sending the request;
receive power from the first networking switch device through the first port subsequent to sending the request;
provide power that is received from the first networking switch device through the first port to the first powered device through the third port; and
communicate data to the first powered device through the third port;
receive, through the second port from the second networking switch device, a request for power;
provide, in response to receiving the request for power from the second networking switch device, power that is received through the first port from the first powering device to the second networking switch device through the second port;
determine power provided to the second networking switch device through the second port is insufficient to satisfy the request for power from the second networking switch device and, in response, send a request for additional power to the first networking switch device;
receive additional power through the first port from the first networking switch device subsequent to sending the request for additional power; and
provide at least some of the additional power that is received from the first networking switch device to the second networking switch device through the second port.

7. The IHS of claim 6, wherein the third port is an access port, and wherein each of the first port and the second port are trunk ports.

8. The IHS of claim 6, wherein the third networking switch device is coupled to a power source that is separate from the first networking switch device and the second networking switch device, and wherein the third networking switch device is configured to determine that power available from the power source is insufficient to power the first powered device.

9. The IHS of claim 8, further comprising
wherein the third networking switch device is further configured to:
provide power that is received from the power source to the second networking switch device through the second port.

10. The IHS of claim 6, wherein the third networking switch device is coupled to the first networking switch device through the first port and at least one additional port on the third networking switch device, wherein each of the first port and the at least one additional port is configured to communicate data with the first networking switch device, provide power to the first networking switch device, and receive power from the first networking switch device, and wherein the third networking switch device is further configured to:
send, to the first networking switch device that is coupled to the first port and at least one additional port, the request for power to be provided from the first networking switch device, wherein the first networking switch device is not providing power to the third networking switch device through the first port and the at least one additional port prior to sending the request;
receive power from the first networking switch device through the first port and the at least one additional port subsequent to sending the request; and
provide power that is received through the first port and the at least one additional port from the first networking switch device to the first powered device through the third port.

11. The IHS of claim 10, wherein the first port and the at least one additional port are configured as a Link Aggregation Group (LAG).

12. A method for distributing power, comprising:
determining, by a first powering device, that power available to the first powering device is insufficient to power a powered device that is coupled to the first powering device through a first port on the first powering device that is configured to communicate data with the powered device and provide power to the powered device;

sending, by the first powering device to a second powering device in response to determining that the power available to the first powering device is insufficient to power the powered device, a request for power that is to be provided from the second powering device through a second port on the first powering device that is configured to communicate data with the second powering device, provide power to the second powering device, and receive power from the second powering device, wherein the second powering device is not providing power to the first powering device prior to sending the request;

receiving, by the first powering device the second powering device, power through the second port subsequent to sending the request;

providing, by the first powering device to the first powered device, power that is received from the second powering device through the first port;

communicating, by the first powering device to the first powered device, data through the first port;

receiving, by the first powering device from a third powering device, a request for power through a third port on the first powering device that is configured to communicate data with the third powering device, provide power to the third powering device, and receive power from the third powering device;

providing, by the first powering device to the third powering device in response to receiving the request for power from the third powering device, power that is received from the second powering device through the third port;

determining, by the first powering device, that power provided to the third powering device through the third port is insufficient to satisfy the request for power from the third powering device and, in response, sending a request for additional power to the second powering device;

receiving, by the first powering device, additional power through the second port from the second powering device subsequent to sending the request for additional power; and providing, by the first powering device to the third powering device, at least some of the additional power that is received from the second powering device through the third port.

13. The method of claim 12, wherein the first port is an access port, and wherein the second port and the third port are trunk ports.

14. The method of claim 12, wherein the first powering device is coupled to a power source that is separate from the second powering device and the third powering device, and wherein the first powering device is configured to determine that power available from the power source is insufficient to power the powered device.

15. The method of claim 14, further comprising:
providing, by the first powering device to the third powering device, power that is received from the power source through the third port.

16. The method of claim 12, wherein the first powering device is coupled to the second powering device through the second port and at least one additional port on the first powering device that is configured to communicate data with the second powering device, provide power to the second powering device, and receive power from the second powering device, and wherein the method further comprises:
sending, by the first powering device to the second powering device, the request for power that is to be provided from the second powering device that is not providing power to the first powering device through the second port and the at least one additional port prior to sending the request;

receiving, by the first powering device from the second powering device, power through the second port and the at least one additional port subsequent to sending the request; and providing, by the first powering device to the third powering device, power that is received through the second port and the at least one additional port through the third port.

17. The method of claim 16, wherein the second port and the at least one additional port are configured as a Link Aggregation Group (LAG).

* * * * *

UNITED STATES PATENT AND TRADEMARK OFFICE
CERTIFICATE OF CORRECTION

PATENT NO. : 9,690,343 B2
APPLICATION NO. : 14/178102
DATED : June 27, 2017
INVENTOR(S) : Victor B. Teeter Page 1 of 1

It is certified that error appears in the above-identified patent and that said Letters Patent is hereby corrected as shown below:

In the Claims

In Column 13, Line 26: need to insert --port-- after "fourth".

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*